(12) United States Patent
Lattanzi et al.

(10) Patent No.: US 10,475,234 B2
(45) Date of Patent: Nov. 12, 2019

(54) MULTI-STAGE METHOD OF GENERATING 3D CIVIL SITE SURVEYS

(71) Applicant: GEORGE MASON UNIVERSITY, Fairfax, VA (US)

(72) Inventors: David Lattanzi, Fairfax, VA (US); Ali Khaloo, Falls Church, VA (US)

(73) Assignee: George Mason University, Fairfax, VA (US)

( * ) Notice: Subject to any disclaimer, the term of this patent is extended or adjusted under 35 U.S.C. 154(b) by 126 days.

(21) Appl. No.: 15/211,041

(22) Filed: Jul. 15, 2016

(65) Prior Publication Data

US 2017/0018113 A1   Jan. 19, 2017

Related U.S. Application Data

(60) Provisional application No. 62/192,882, filed on Jul. 15, 2015.

(51) Int. Cl.
*G06T 15/20* (2011.01)
*G06T 17/05* (2011.01)
*G01C 11/04* (2006.01)

(52) U.S. Cl.
CPC ............ *G06T 15/205* (2013.01); *G06T 17/05* (2013.01); *G01C 11/04* (2013.01); *G06T 2200/08* (2013.01); *G06T 2207/10004* (2013.01); *G06T 2207/10028* (2013.01); *G06T 2207/10032* (2013.01); *G06T 2207/20016* (2013.01)

(58) Field of Classification Search
None
See application file for complete search history.

(56) References Cited

U.S. PATENT DOCUMENTS

2003/0063816 A1* 4/2003 Chen .................... G06T 3/0018
                                                382/284
2013/0212538 A1* 8/2013 Lemire ............... G06F 3/04815
                                                715/850

(Continued)

OTHER PUBLICATIONS

Global Registration of Multiple Point Clouds Embedding the Generalized Procrustes Analysis into an ICP Framework , Roberto Toldo, Fabio Crosilla, Alberto Beinat; Article, Jan. 2010, Researchgate.

(Continued)

*Primary Examiner* — Yi Wang
(74) *Attorney, Agent, or Firm* — Morris, Manning & Martin, LLP; Daniel E. Sineway, Esq.; Daniel T. Begasse (57) ABSTRACT

A method of creating a three-dimensional model, based on two-dimensional (hereinafter "2D") images is provided. The method includes acquiring a number of images of a number of physical locations, wherein each image is associated with one image group of a number of hierarchical image groups, the number of hierarchical image groups including a base image group, converting images within a group to a number of 3D models, wherein each 3D model is associated with one model group of a number of hierarchical model groups, the number of hierarchical model groups including a base model group, merging a number of the 3D models from the base model group and a number of 3D models from another 3D model group to create a multi-scale 3D model, and utilizing the multi-scale 3D model.

11 Claims, 8 Drawing Sheets

(56) References Cited

U.S. PATENT DOCUMENTS

2014/0267257 A1\* 9/2014 Overbeck ............... G06T 15/04
345/422
2015/0262421 A1\* 9/2015 Bell ....................... G06T 17/20
345/423
2016/0350969 A1\* 12/2016 Castillo .............. H04N 5/23222

OTHER PUBLICATIONS

A Method for Registration of 3-D Shapes, Paul J. Best, and Neil D. McKay, IEEE Transactions on Pattern Analysis and Machine Intelligence, vol. 14, No. 2, Feb. 1992.

\* cited by examiner

| |
|---|
| 1000 Acquiring a number of images of a number of physical locations |
| 1001 Scanning images/pictures |
| 1002 Acquiring a number of pictures of a number of physical locations |
| 1004 Acquiring drone pictures |
| 1006 Acquiring a number of pictures for the base picture group |
| 1016 Acquiring a number of pictures of the feature of interest |
| 1008 Acquiring a number of pictures for a superior hierarchical picture group |
| 1010 Acquiring a number of pictures of each physical location from a different angle |
| 1012 Acquiring a number of pictures over an arc |
| 1014 Acquiring a number of pictures over an arc of between 70 degrees and about 180 degrees |
| 1020 Acquiring a number of pictures of adjacent locations |
| 1030 Providing about 90% overlap for pictures of adjacent locations in the base picture |
| 1032 Providing between about 80-90% overlap for pictures of adjacent locations in each intermediate hierarchical picture group |
| 1034 Providing about 80% overlap for pictures of adjacent locations in the top picture group |
| 1050 Acquiring a number of pictures with each picture having a set of characteristics |

MULTI-STAGE METHOD OF GENERATING 3D CIVIL SITE SURVEYS

CROSS REFERENCE TO RELATED APPLICATION

This application claims priority to U.S. Provisional Patent Application Ser. No. 62/192,882, filed Jul. 15, 2015, entitled MULTI-STAGE METHOD OF GENERATING 3D CIVIL SITE SURVEYS.

BACKGROUND OF THE INVENTION

Field of the Invention

The disclosed and claimed concept relates to creating and utilizing three dimensional models of physical locations wherein the model is generated from images of the physical location, and, more particularly to models generated from pictures of the physical locations.

Background Information

Useful information is acquired from creating and utilizing three-dimensional (hereinafter "3D") models of physical locations wherein the model is generated from images of the physical location. For example, after a disaster, such as an earthquake, inspectors are tasked with assessing the integrity of affected buildings and structures. Depending on the scale of the disaster, the number of required inspections can range into the thousands. There are both public safety and economic pressures to consider and; as such, rapid and accurate assessments of buildings and structures are vital.

Civil site surveyors and inspectors use several types of technologies to generate virtual 3D models of facilities. For example, a Terrestrial Laser Scanner (TLS) utilizes a laser to acquire complex geometric data from constructs such as, but not limited to, buildings and bridges. Data points are determined by the position (x, y, z) and the intensity (i) of the returning laser signal and are used to generate a 3D model of the construct within a computer. A photogrammetric approach utilizes photographs of a construct from a number of angles from which positions of surface points are determined and are used to generate a 3D model of the construct within a computer. These methods, however, do not produce models with adequate resolution for safety inspection.

That is, for example, these types of technologies do not provide sufficient data to create a 3D model of the structure with accurate geometry and high-fidelity representation of fine details, to generate point clouds accurate enough to resolve structural flaws on the order of 0.1 mm, to extract structural components through a feasible, i.e., within the ability of known processing technology, segmentation process, or allow for Automated 3D damage detection. Thus, the stated problem is that methods noted above do not produce models with adequate resolution for safety inspection as well as the other problems noted above.

SUMMARY OF THE INVENTION

The disclosed and claimed concept provides a method of creating a three-dimensional model, based on two-dimensional (hereinafter "2D") images which includes, acquiring a number of images of a number of physical locations, wherein each image is associated with one image group of a number of hierarchical image groups, the number of hierarchical image groups including a base image group, converting images in a group to a number of 3D models, wherein each 3D model is associated with one model group of a number of hierarchical model groups, the number of hierarchical model groups including a base model group, merging a number of the 3D models from the base model group and a number of 3D models from another 3D model group to create a multi-scale 3D model, and utilizing the multi-scale 3D model.

The disclosed and claimed method solves the problems stated above. More particularly, the method of acquiring a number of images and the method of merging a number of the 3D models, both discussed below, solve the problems stated above.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move, or the member is otherwise configured to move, in response to other elements or assemblies. As such, as used herein, "structured to [verb]" recites structure and not function. That is, as used herein, "structured to [verb]" recites structure(s) as would be understood by one of ordinary skill in the art.

As used herein, the term "number" shall mean one or an integer greater than one (i.e., a plurality).

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening is/are made from a deformable or compressible material, the opening may even be slightly smaller than the component being inserted into the opening. With regard to surfaces, shapes, and lines, two, or more, "corresponding" surfaces, shapes, or lines have generally the same size, shape, and contours.

As used herein, a "computer" is a device structured to process data having at least one input device, e.g., a keyboard, mouse, or touch-screen, at least one output device, e.g., a display, a graphics card, a communication device, e.g., an Ethernet card or wireless communication device, permanent memory, e.g., a hard drive, temporary memory, i.e., random access memory, and a processor, e.g. a programmable logic circuit. The "computer" may be a traditional desktop unit but also includes cellular telephones, tablet computers, laptop computers, as well as other devices, such as gaming devices that have been adapted to include components such as, but not limited to, those identified above. Further, the "computer" may include components that are physically in different locations. For example, a desktop unit may utilize a remote hard drive for storage. Such physically separate elements are, as used herein, a "computer."

As used herein, the word "display" means a device structured to present a visible image. Further, as used herein, "present" means to create an image on a display which is, or can be, seen by a user.

As used herein, a "computer readable medium" includes, but is not limited to, hard drives, CDs, DVDs, magnetic tape, floppy drives, and random access memory.

As used herein, "permanent memory" means a computer readable storage medium and, more specifically, a computer readable storage medium structured to record information in a non-transitory manner. Thus, "permanent memory" is limited to non-transitory tangible media.

As used herein, "stored in the permanent memory" means that a module of executable code, or other data, has become functionally and structurally integrated into the storage medium.

As used herein, a "file" is an electronic storage construct for containing executable code that is processed, or, data that may be expressed as text, images, audio, video or any combination thereof.

As used herein, a "module" is an electronic construct used by a computer, or other processing assembly, and includes, but is not limited to, a computer file or a group of interacting computer files such as an executable code file and data storage files, which are used by a processor and stored on a computer readable medium. Modules may also include a number of other modules. It is understood that modules may be identified by an indication what the module is created to do. For example, a "storage module" is structured to store data, files, or other modules. Unless noted otherwise, each "module" is stored in permanent memory of at least one computer or processing assembly. All modules are shown schematically in the Figures.

As used herein, "in electronic communication" is used in reference to communicating a signal via an electromagnetic wave or signal. "In electronic communication" includes both hardline and wireless forms of communication.

As used herein, "in electric communication" means that a current passes, or can pass, between the identified elements.

As used herein, "hierarchical" means arranged in a hierarchy, i.e., in a series of levels. A level/group is either "superior" or "inferior" to another level/group. As used herein, "superior" means above in the hierarchy, and, "inferior" means below in the hierarchy. As used herein, a "base" level or group is the lowest level or group. As used herein, a "top" level or group is the highest level or group. As used herein, an "intermediate" level or group is between the base level or group and the top level or group. Further, each "intermediate" level or group is both, as used herein, "superior" to the level or group below, and, as used herein, "inferior" to the level or group above. For example, a hierarchy of groups includes a base group, a first intermediate group, a second intermediate group, and a top group. Thus, the first intermediate group is "superior" to the base group and "inferior" to the second intermediate group. Further, as used herein, "hierarchical [X]" is used to identify characteristics of a hierarchical level or group. That is, for example, a "hierarchical distance" is a distance associated with all elements of a single hierarchical level or group.

As used herein, an "image" is a construct that represents something visible to the human eye. For example, a "picture," as defined below, is an "image." Further, a set of data, such as, but not limited to, data collected by a TLS, that can be used to create a model is also an image.

As used herein, a "picture" is a construct that is visible to the human eye and that shows, in two dimensions, a physical object as it exists in reality. "Pictures" include, but are not limited to, photographs and digital photographs. Data, i.e., a list or table of numbers, such as, but not limited to, data collected by a TLS is not a "picture." Further, a description of a physical object is not a "picture."

As used herein, a "multi-scale 3D model" means a model, i.e., a set of data used in computer modeling, that includes data from at least three hierarchical groups of images/pictures wherein the images/pictures within a hierarchical group have a different scale, or field of view, compared to the images/pictures within the other hierarchical groups.

Figure 1A:
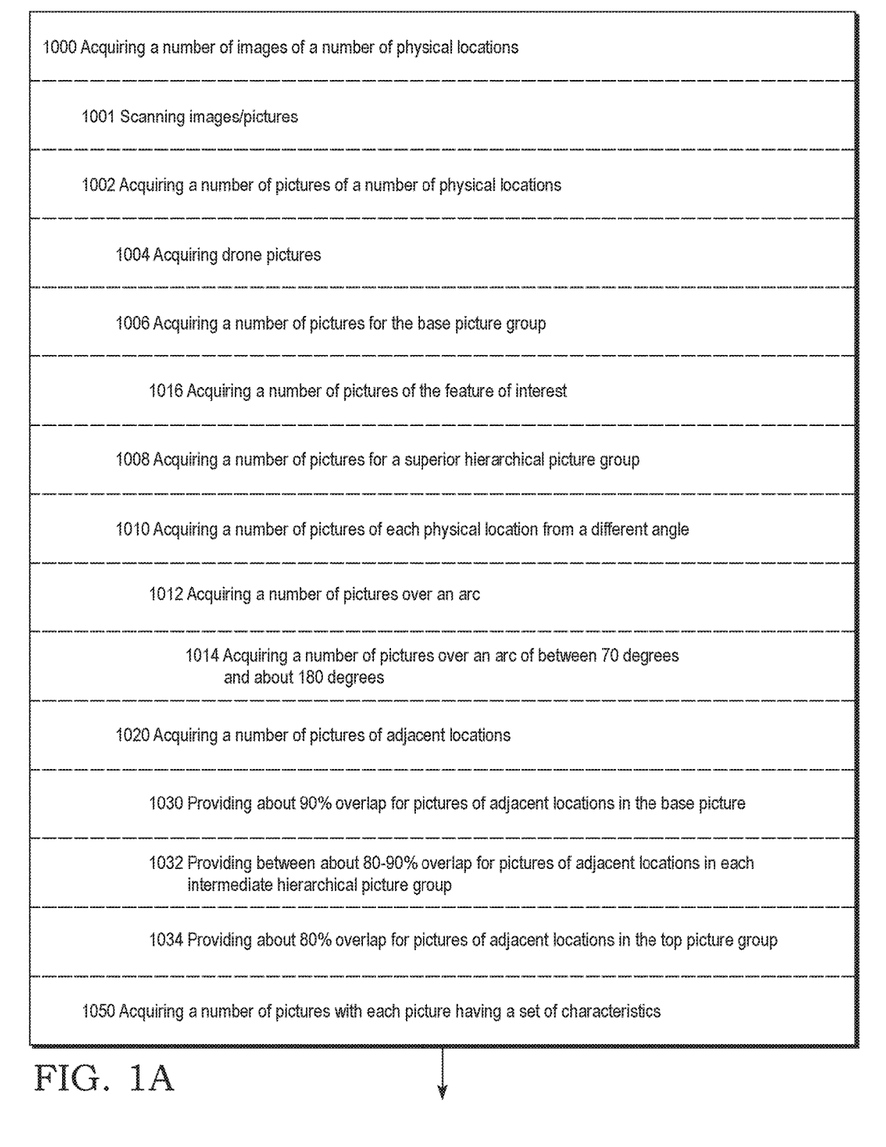
FIGS. 1A-1C are a flowchart of the disclosed method.
Figure 1B:
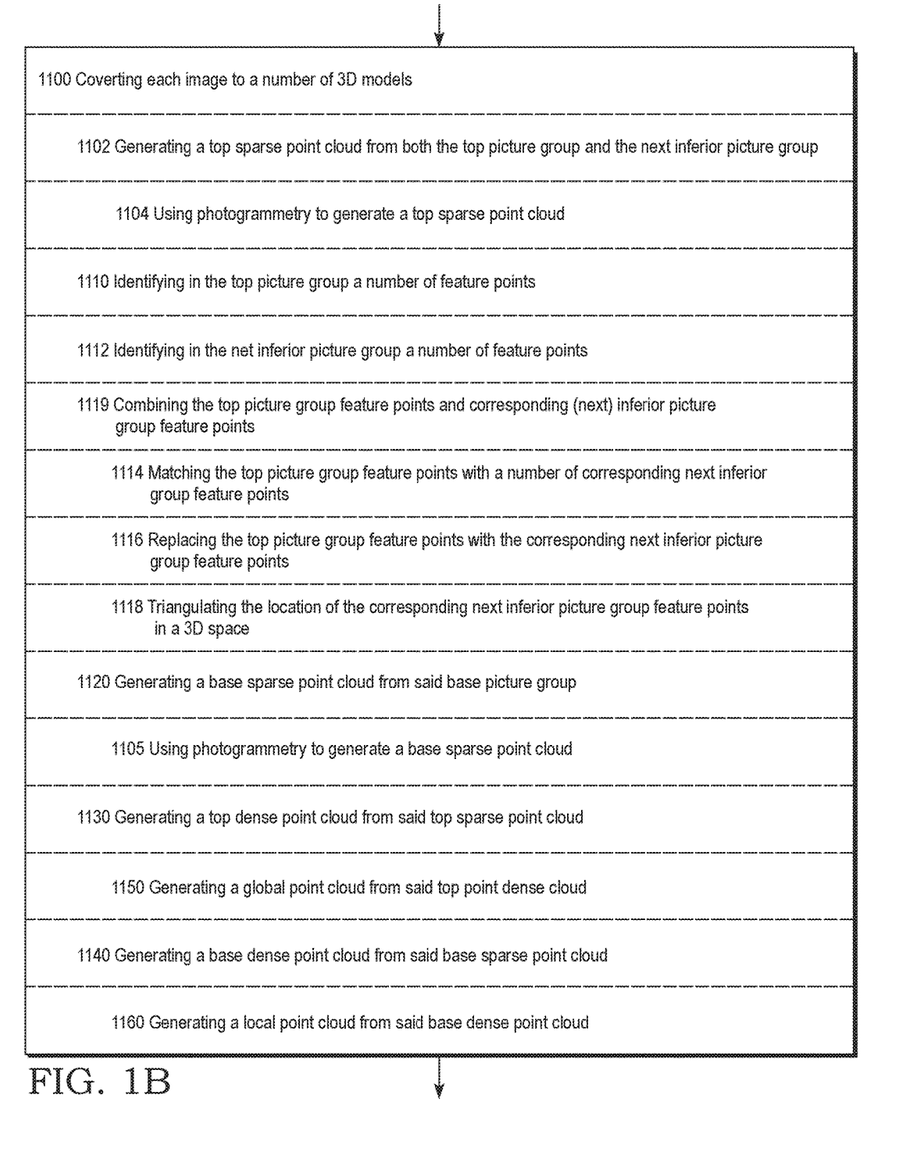
Figure 1C:
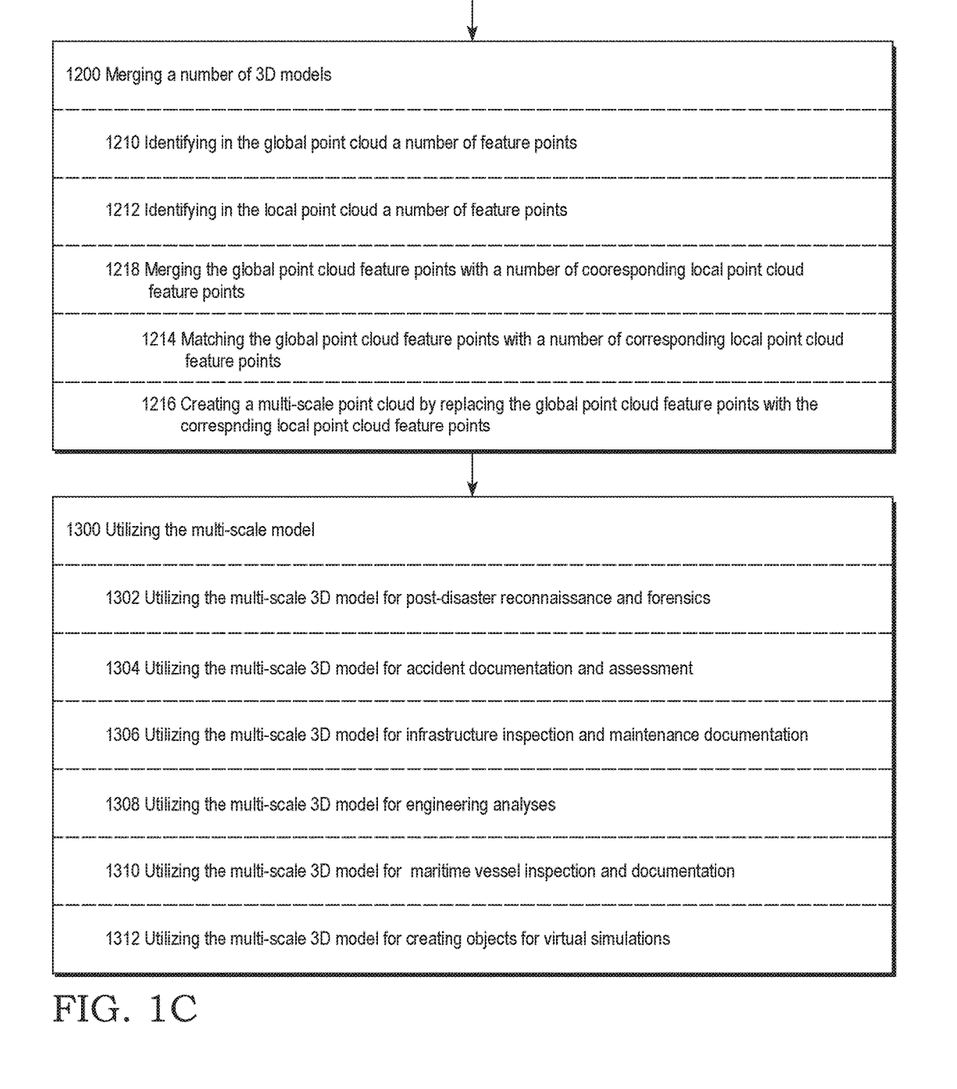

As shown in FIG. 1, a method of creating a three-dimensional (3D) model based on two dimensional images includes acquiring 1000 a number of images of a number of physical locations, wherein each image is associated with one image group of a number of hierarchical image groups, the number of hierarchical image groups including a base image group and a top image group, converting 1100 images within a group to a number of 3D models, wherein each 3D model is associated with one model group of a number of hierarchical model groups, the number of hierarchical model groups including a base model group and a top model group, merging 1200 a number of the 3D models from the base model group and a number of 3D models from another 3D model group to create a multi-scale 3D model, and utilizing 1300 the multi-scale 3D model. In an exemplary embodiment, acquiring 1000 a number of images includes acquiring 1002 a number of pictures of a number of physical locations, wherein each picture is associated with one picture group of a number of hierarchical picture groups, the number of hierarchical picture groups including a base picture group, a number of intermediate hierarchical picture groups, and atop picture group. The following discussion uses pictures as an exemplary embodiment; it is understood that, in another embodiment, the term "picture" is replaced with the term "image."

Acquiring 1002 a number of pictures of a number of physical locations, in an exemplary embodiment, includes acquiring 1004 drone pictures. As used herein, a "drone picture" is a picture taken by a camera, or similar device, mounted on a drone. In an exemplary embodiment, acquiring 1002 a number of pictures of a number of physical locations also includes acquiring 1006 a number of pictures for the base picture group, wherein the pictures for the base picture group are acquired from abase distance from the physical location, acquiring 1008 a number of pictures for a superior hierarchical picture group, wherein the pictures for superior hierarchical picture group are acquired from a hierarchical distance, and wherein each hierarchical distance for a superior hierarchical picture group is greater than the hierarchical distance for an inferior hierarchical picture group. Further, acquiring a number of pictures 1002 includes acquiring 1010 a number of pictures of each physical location from a different angle. Acquiring 1010 a number of pictures of each physical location from a different angle, in an exemplary embodiment, includes acquiring 1012 a number of pictures over an arc. For example, acquiring 1012 a number of pictures over an arc includes acquiring 1014 a number of pictures over an arc of between about 70 degrees and about 180 degrees.

In an exemplary embodiment, the number of images, or pictures include adjacent locations. Thus, acquiring a number of pictures 1002 includes acquiring 1020 a number of pictures of adjacent locations wherein pictures of each adjacent location in a selected hierarchical picture group have a selected overlap with pictures of the adjacent locations in the same hierarchical picture group, and, wherein the selected overlap for pictures of adjacent locations in an inferior hierarchical picture group have a greater selected overlap relative to pictures of adjacent locations in a superior hierarchical picture group.

To further explain the method of acquiring a number of pictures 1002 disclosed above, the following example is described in relation to FIGS. 2-9. In this example, it is assumed that there are three hierarchical groups; a base group, an intermediate group, and a top group. The base group includes the most detailed information, the intermediate group includes an intermediate level of information, and the top group includes broad information. It is understood that a single intermediate group is used as an example only and that in other embodiments there are multiple intermediate groups. In an alternate embodiment, there are multiple base groups of images (that is, the multiple base groups have similar characteristics). In this embodiment, one base group is identified as "the" base group and the other groups are, therefore, processed as other sets of "intermediate groups," as described below.

Figure 2:
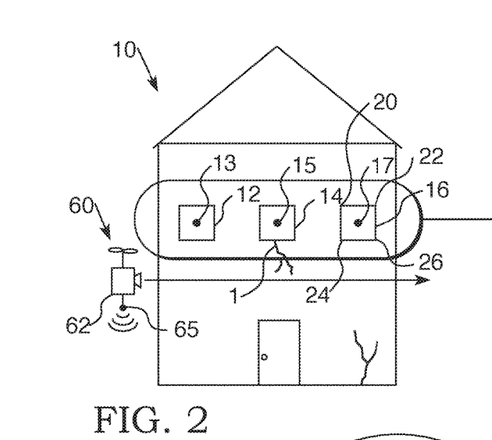
FIG. 2 is a schematic view of a building, a computer and a drone flight path.
Figure 4:
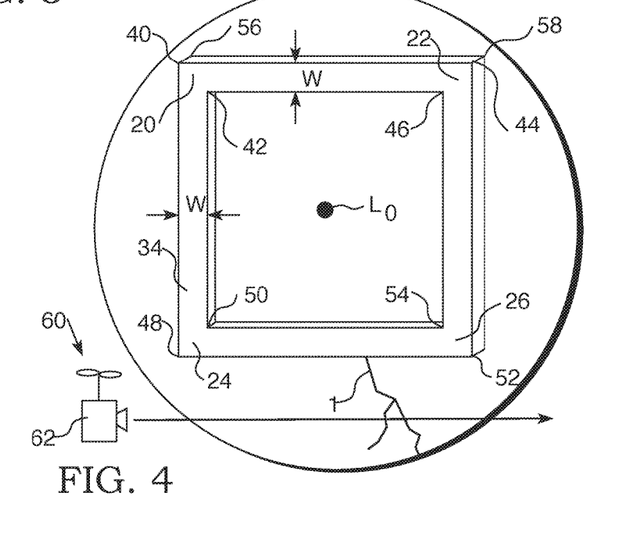
FIG. 4 is a detailed view of a single window on the building.

As shown in FIG. 2, a building 10 has been damaged by an earthquake and a wall has a crack 1. The building 10 includes a number of windows 12, 14, 16. Each window 12, 14, 16 has a center 13, 15, 17, respectively. Further, each window 12, 14, 16 has an upper left corner 20, an upper right corner 22, a lower left corner 24, and a lower right corner 26. Further, each window 12, 14, 16 has frame 32, 34, 36. Each frame 32, 34, 36 has a width "w." Each frame (one shown) includes an outside (meaning space from the wall of the building) outer, upper left corner 40, an outside inner, upper left corner 42, an outside outer, upper tight corner 44, an outside inner, upper right corner 46, an outside outer, lower left corner 48, an outside inner, lower left corner 50, an outside outer, lower right corner 52, an outside inner, right corner 54, and inside (meaning closest to the wall of the building) outer, upper left corner 56, an inside inner, upper left corner (not shown), an inside outer, upper right corner 58, an inside inner, upper right corner (not shown), and on forth. It is understood that certain features are only visible from certain angles. For example, FIG. 4 is shown at a slight downward angle so the "inside," "outer," and "upper" corners are visible. It is understood that at an upward angle, the "inside," "inner," and "lower" corners would be visible. It is understood that the elements identified in this paragraph are simplified exemplary elements and that the disclosed method is capable of capturing pictures with more detailed elements. That is, for example, the captured pictures include identifiable elements, i.e., elements that can be identified and used to generate data points as discussed below). For example, known methods of photogrammetric analysis (i.e., converting images into cloud data) can "identify" features such as edges and corners as well as other features such as, but not limited to, features defined by high contrast regions of the images. As used herein, and with respect to photogrammetry, "identify" means to assign a feature in an image data representing a point in a point cloud such as, but not limited to, a spatial registration in the form of Cartesian coordinates. Known methods of photogrammetric analysis include, but are not limited to, the Scale Invariant Feature Transform, the Speeded Up Robust Features, and the Gradient Location and Orientation Histogram.

As a first example, the method of acquiring a number of pictures 1002 is described in reference to a single location; acquiring 1020 a number of pictures of adjacent locations is described below. In an exemplary embodiment, a flying drone 60 has a digital camera 62 mounted thereon. The drone 60 flies over a base hierarchical path 64. The camera 62 is focused on a location $L_0$. As shown, location $L_0$ is at about the center of the middle window 14. As the drone 60 moves, the camera 62 captures a number of images. In an exemplary embodiment, the drone 60 captures between three and twenty images of location $L_0$, or, in another exemplary embodiment, five images of location $L_0$. In each picture, location $L_0$ is at about the center of the picture. Further, if a construct includes a feature that is unusual, such as but not limited to an anomaly, e.g., crack 1, then the camera 62 captures a number of images of such a "feature of interest." That is, as used herein, a "feature of interest" is any feature on which the user, or a module set up by a user, selects to concentrate.

Figure 5:
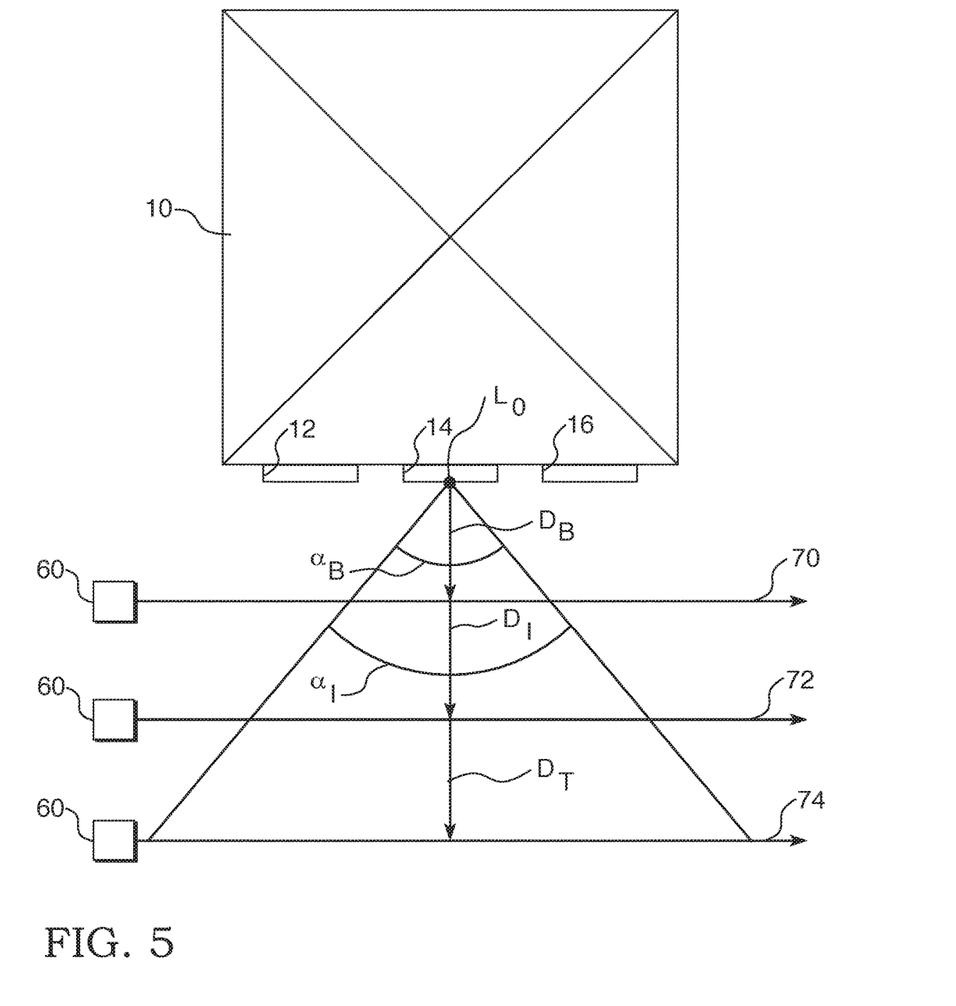
FIG. 5 is a top schematic view of the building also showing a number of drone flight paths.
Figure 6:
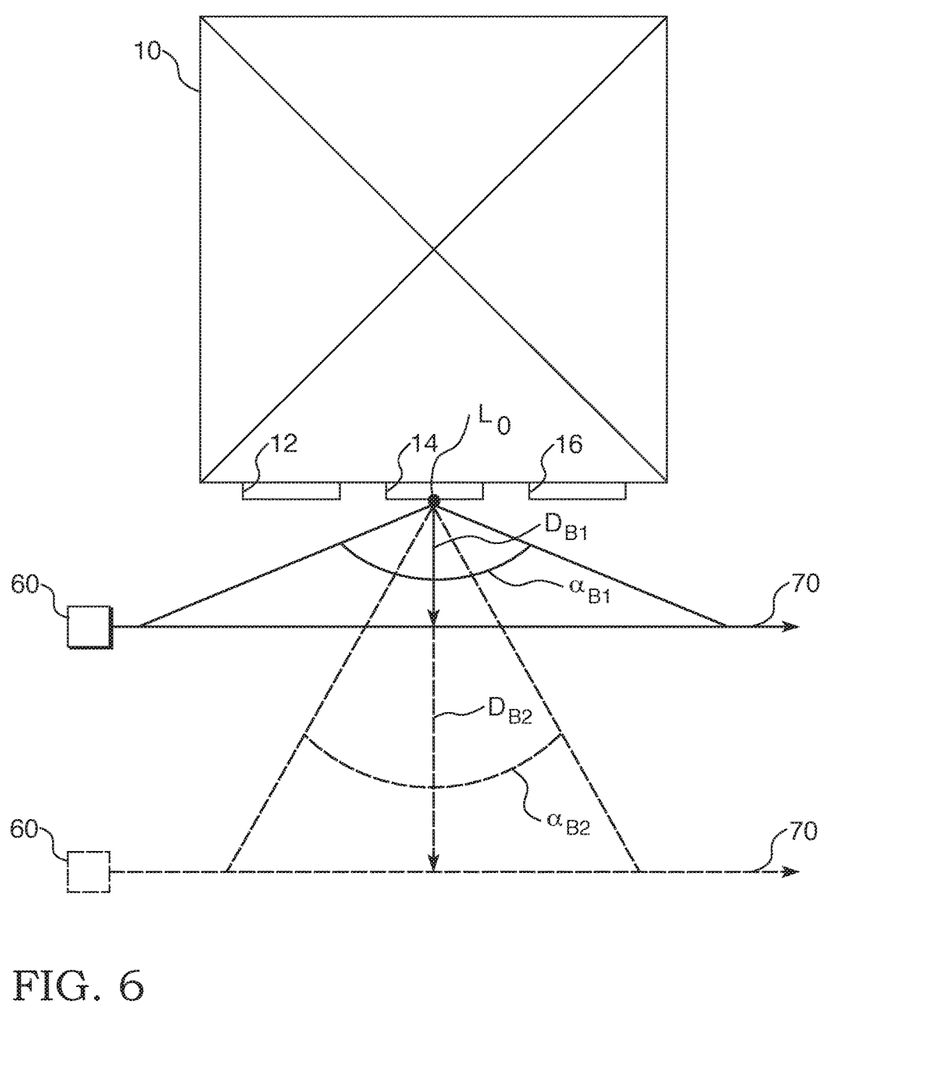
FIG. 6 is another top schematic view of the building also showing a number of drone flight paths.
Figure 7:
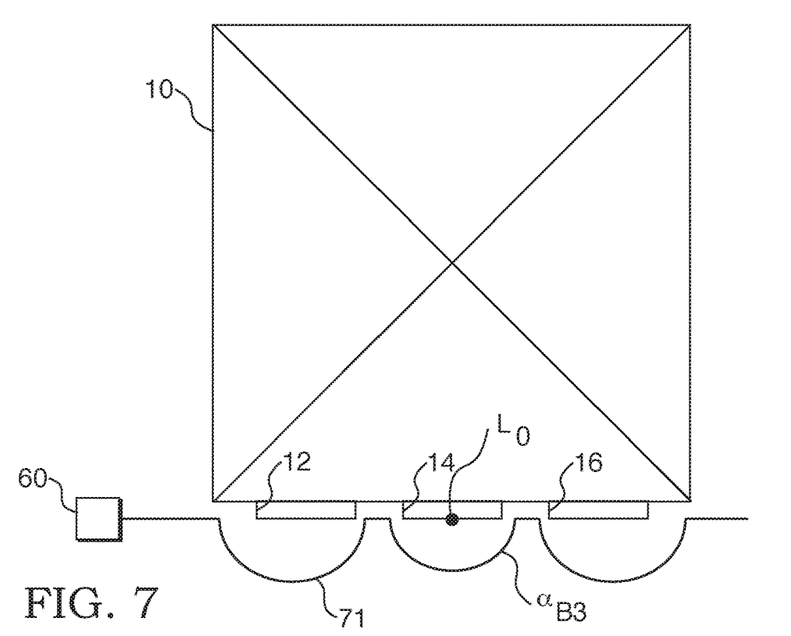
FIG. 7 is another top schematic view of the building also showing an alternate drone flight path.

As shown in FIG. 5, for each hierarchical picture group, the drone 60 follows one of a number of flight paths 70, 72, 74. While one flight path for each group is shown, for clarity, it is understood that any group may include multiple flight paths such as, but not limited to, flight paths at different elevations. In an exemplary embodiment, each flight path 70, 72, 74 is generally level, i.e., generally horizontal and/or remains generally in a single plane. As used herein, "generally horizontal/planar" means horizontal/planar in a general manner and allows for variation due to wind and other known factors associated with drone flight. Further, when acquiring 1006 a number of pictures for the base picture group, wherein the pictures for the base picture group are acquired from abase distance $D_B$ from the physical location, the base distance is a "hierarchical distance." That is, the "hierarchical distance" for the base picture group is identified as the "base distance" $D_B$. In an exemplary embodiment, the base distance $D_{B1}$ is close to the location $L_0$ and the pictures are captured as the drone 60 travels over a wide arc $\alpha_{B1}$, shown as an arc of about 170°, as shown in FIG. 6. Alternatively, as shown in ghost in FIG. 6, the base distance $D_{B2}$ is further from the location $L_0$ and the pictures are captured over a more narrow arc $\alpha_{B2}$, shown as an arc of about 70°. It is understood that the base distance is selectable and the picture capturing arc is between about 70 degrees and about 180 degrees, as described above, That is, as used herein, the "arc" is the angle between the location of the drone 60 when the first image of location $L_0$ is captured and the location of the drone 60 when the last image of location $L_0$ is captured. As used herein, the "arc" exists even when the drone flight path 70 is a generally straight path. Further, in another embodiment as shown in FIG. 7, the drone 60 follows an arcuate flight path 71 with the arc centered about the location $L_0$. In this embodiment, the picture capturing arc $\alpha_{B3}$ is about 180 degrees.

Further, at base distance $D_B$ the resolution of the picture is sufficient to identify each frame corner 40, 42, 44, 46, 48, 50, 52, 54 as well as other details such as crack 1. That is, it is understood that because base distance $D_B$ is the closest distance to the building 10 that the drone 60 travels, the pictures in the base picture group have more detail relative to other hierarchical picture groups.

Further, as used herein, the "angle" of a picture is determined as follows. Each flight path 70, 71, 72, 74 has an axis, hereinafter, and as used herein, the "flight path axis." For a generally straight flight path 70, 72, 74, and as used herein, the flight path 70, 72, 74 is coextensive with the "flight path axis." For an arcuate flight path 71, and as used herein, the "flight path axis" is a straight line disposed in the plane of the arcuate flight path and extending between peaks of the arcuate flight path. For other flight paths, such as, but not limited to a generally circular flight path about a tower or an asymmetrical flight path, the "flight path axis," as used herein, is a line selected by the user that provides a reasonable basis, as would be understood by one of ordinary skill in the art, for identifying angles relative to the location $L_0$. As used herein, a "location line" is a line through the location $L_0$ and parallel to the flight path axis. As used herein, a "drone line" is a line between the location $L_0$ and the drone. The "angle" of a picture is the angle between the location line and the drone line at the time a picture is captured.

Further, the number of pictures captured for a group are, in an exemplary embodiment, captured generally evenly over the picture capturing arc. That is, for example, if the picture capturing arc extends over about 150 degrees and there are five pictures in the group, then the pictures are captured at about 30 degree intervals over the picture capturing arc. In another embodiment, more pictures are captured at the ends of the picture capturing arc.

Returning to FIG. 2, after acquiring 1006 a number of pictures for the base picture group at the base distance $D_B$ and over arc $\alpha_B$, the drone 60 moves to an intermediate flight path 72. The intermediate flight path 72 is at a further, intermediate distance $D_I$ than the base distance $D_B$ but is closer than the top distance $D_T$, discussed below. Acquiring 1008 a number of pictures for a superior hierarchical picture group, wherein the pictures for superior hierarchical picture group are acquired from a hierarchical distance, occurs when traveling over the intermediate flight path 72. That is, the intermediate distance $D_I$ is further from the location $L_0$ than the base distance $D_B$. Further, it is understood that the intermediate distance $D_I$ is, in this example, the "hierarchical distance" for the intermediate group of pictures. Further, it is understood that, in this example with a single intermediate picture group, the intermediate picture group is the "superior hierarchical picture group" relative to the base picture group (which is also the inferior hierarchical picture group relative to the intermediate picture group). Further, in this example and at intermediate distance $D_I$ the resolution of the picture is sufficient to identify each window corner 20, 22, 24, 26. Further, at intermediate distance $D_I$ the resolution of the picture is sufficient to identify crack 1, but with less detail than at base distance $D_B$. That is, it is understood that because intermediate distance $D_I$ is the further from building 10 than base distance $D_B$, the pictures in the intermediate picture group have less detail relative to the pictures in the base picture group.

The drone 60 then moves to the top distance $D_T$. In an exemplary embodiment, acquiring 1002 a number of pictures of a number of physical locations also includes acquiring 1009 a number of pictures for the top picture group, wherein the pictures for the top picture group are acquired from a top distance $D_T$. The top distance is greater than the next inferior hierarchical which, in this example, is intermediate distance $D_I$. That is, acquiring 1009 a number of pictures for the top picture group is substantially similar to acquiring 1008 a number of pictures for a superior hierarchical picture group, wherein the pictures for superior hierarchical picture group are acquired from a hierarchical distance as described above, except that the top picture group is the final group of pictures to be captured. In an exemplary embodiment, acquiring 1009 a number of pictures for the top picture group utilizes a single flight path for the drone 60 (or a single path of travel for a camera).

Figure 8:
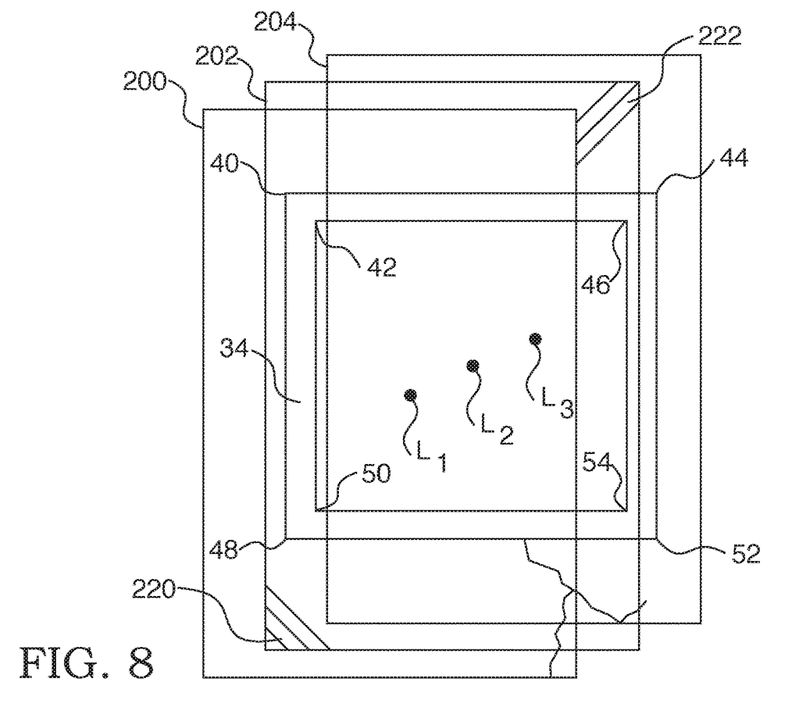
FIG. 8 is a schematic view showing pictures of a window.
Figure 9:
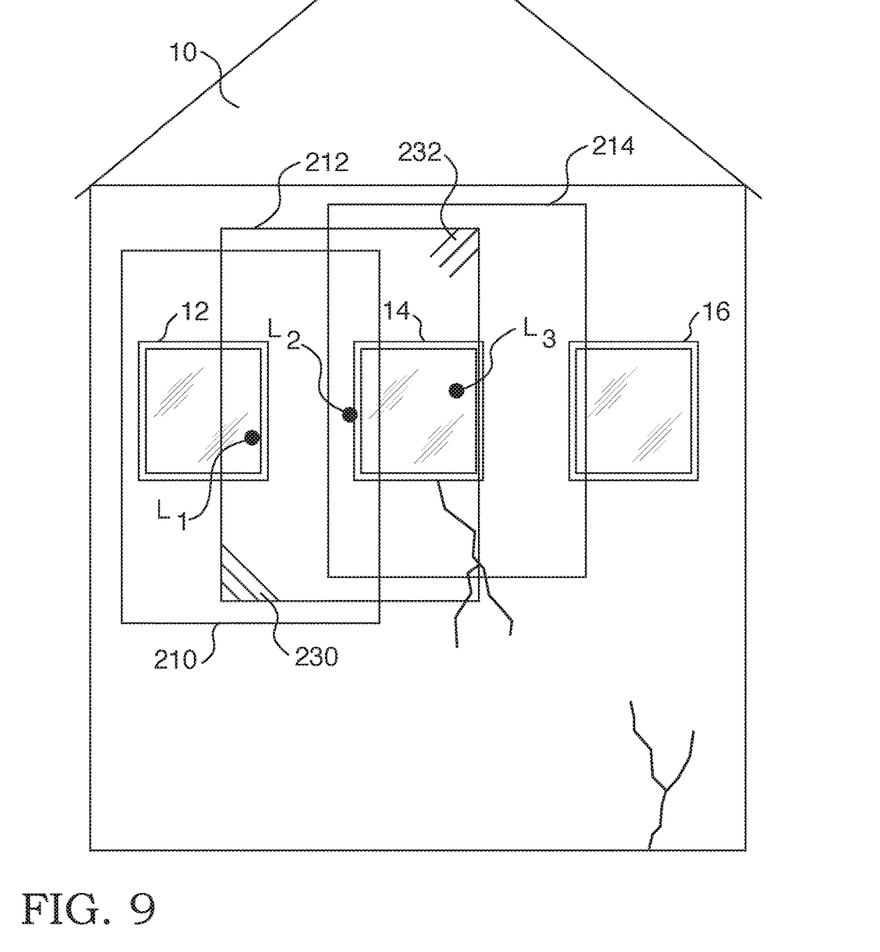
FIG. 9 is a schematic view showing pictures of the building.

As noted above, acquiring a number of pictures 1002 includes acquiring 1020 a number of pictures of adjacent locations wherein pictures of each adjacent location in a selected hierarchical picture group have a selected overlap with pictures of the adjacent locations in the same hierarchical picture group, and, wherein the selected overlap for pictures of adjacent locations in an inferior hierarchical picture group have a greater selected overlap relative to pictures of adjacent locations in a superior hierarchical picture group. As shown in FIGS. 8-9, each set of pictures 200, 202, 204, and 210, 212, 214 includes an "overlap" 220, 222, and 230, 232. That is, as used herein, an "overlap" is an area of a picture that is also captured in another picture. For example, FIG. 8 shows the area captured in pictures 200, 202, 204 as part of the base picture group. In FIG. 8, the area captured in pictures 200, 202, 204 are slightly offset vertically for clarity; it is understood that such an offset is not required. A first picture 200 is centered on a first location $L_1$. A second picture 202 is centered on a second location $L_2$. A third picture 204 is centered on a third location $L_3$. The first and second pictures 200, 202 have a first area of overlap 220. Similarly, the second and third pictures 202, 204 have a second area of overlap 222. For pictures in the base picture group, the first and second areas of overlap 220, 222 represent about 90% of the respective pictures 200, 202 and 202, 204. In this configuration, all three pictures 200, 202, 204 also have an extended overlap area wherein the first and third pictures 200, 204 also overlap; this area of non-adjacent image overlap is unmarked in FIG. 8. That is, as used herein, "overlap" means the areas of adjacent pictures that capture the same part of the physical location captured in the picture. Further, "extended overlap" means the areas of non-adjacent pictures that capture the same part of the physical location captured in the picture.

Similarly, as shown in FIG. 9, the area captured in pictures 210, 212, 214 are part of the top picture group. In FIG. 9, the area captured in pictures 210, 212, 214 are slightly offset vertically for clarity; it is understood that such an offset is not required. A first picture 210 is centered on a first location $L_1$. A second picture 212 is centered on a second location $L_2$. A third picture 214 is centered on a third location $L_3$. The first and second pictures 210, 212 have a first area of overlap 230. Similarly, the second and third pictures 212, 214 have a second area of overlap 232. For pictures in the intermediate picture group, the first and second areas of overlap 230, 232 represent between about 80%-90% of the respective pictures 220, 222 and 222, 224. If the pictures shown in FIG. 9 were pictures in the top picture group, the first and second areas of overlap 230, 232 represent about 80% of the respective pictures 220, 222 and 222, 224.

Thus, acquiring 1020 a number of pictures of adjacent locations, as well as acquiring 1002 a number of pictures of a number of physical locations, includes providing 1030 about 90% overlap for pictures of adjacent locations in the base picture group, providing 1032 between about 80%-90% overlap for pictures of adjacent locations in each intermediate hierarchical picture group, and providing 1034 about 80% overlap for pictures of adjacent locations in the top picture group.

Further, in an instance wherein a physical location includes a feature of interest, acquiring a number of pictures 1002 includes acquiring 1016 a number of pictures of a feature of interest. The acquisition 1016 of the number of pictures of a feature of interest, in an exemplary embodiment, occurs during the acquisition 1006 a number of pictures for the base picture group. The pictures of the feature of interest are hereinafter considered part of the group of pictures to which they belong. That is, the pictures of the feature of interest are not treated any different than the other pictures in the associated group.

Further, acquiring 1002 a number of pictures of a number of physical locations also includes acquiring 1050 a number of pictures with each picture having a set of characteristics. As used herein, and in reference to pictures, the "characteristics" are the traits and properties of the pictures. These include, but are not limited to, the resolution of the picture, the number of colors, the number of shades of grey (e.g., for a black and white picture), the field of view, the ratio of pixel size to target (e.g., the size of a digital picture element to the corresponding area of the location being pictured), and other traits of photographs. The "characteristics" also include properties such as the distance between the camera and the location, as discussed above, the angles of the pictures, as discussed above, and the time of day/year during which the pictures are captured (it is noted that shadows during a winter evening are different compared to shadows during a summer morning). In an exemplary embodiment, pictures within each hierarchical picture group have generally the same relevant characteristics. That is, for example, if the pictures are of an inside location with artificial lighting whereby shadows are always the same, the time of day/year is not a relevant characteristic.

The method disclosed below uses photogrammetry and, as such, selected terms relating to photogrammetry are discussed and defined herein. As noted above, photogrammetry produces data in the form a point cloud wherein, in an exemplary embodiment, each point in the point cloud defines a spatial registration in the form of Cartesian coordinates. As is known, an initial photogrammetric analysis produces a "sparse point cloud." As used herein, a "sparse point cloud" is a point cloud wherein the distance between points is so large that an image created using the points in the "sparse point cloud" is non-photorealistic from any reasonable viewing distance. As a simplified example, a "sparse point cloud" having points representing a window frame may include limited points at the corners of the frame and a limited number of points along the edges, but an image produced from such data would have large gaps between the points. Using known algorithms, a "sparse point cloud" is converted to a "dense point cloud." As used herein, a "dense point cloud" is a point cloud wherein the distance between points is reduced so that an image created using the points in the "dense point cloud" appears to be solid and photorealistic from a reasonable viewing distance (i.e., not extremely close up to the object). Further, as used herein, a sparse point cloud or a dense point cloud may be given a specific name. For example, as used herein, the dense point cloud created from the base picture group are identified as the "local point cloud" and the dense point cloud created from the top picture group, or data from multiple picture groups including the top picture group, is identified as the "global point cloud."

Further, when discussing the blending of point clouds, as used herein, "combining" relates to sparse point clouds, and, "merging" relates to dense point clouds. It is understood that, as sparse point clouds include fewer points, combining sparse point clouds requires less computing power and is accomplished more quickly than merging dense point clouds. It is further understood that combined sparse point clouds still include less data than a dense point cloud. Conversely, merging dense point clouds requires more computing power and is accomplished more slowly than merging sparse point clouds. A merged dense point cloud has more points than the original dense point clouds that have been merged. Thus, it is understood that point clouds can be combined/merged at any time, but there is a problem in balancing the desire for a high quality final point cloud with the desire to complete the combination/merging in a reasonable time on the equipment that is available. As discussed below, in an exemplary embodiment, the method includes combining sparse point clouds from the top and any intermediate image/picture groups. The combined top sparse model, discussed below, is converted into a top dense point cloud which is then merged with a local point cloud (which is the dense point cloud generated from the base picture group.) This method solves the problem stated above. Whether "combining" or "merging" the sparse point clouds and dense point clouds; respectively, in an exemplary embodiment, the combining/merging include use of the Iterative Closest Point (ICP) algorithm (Besl; Paul J.; N. D. McKay (1992); *A Method for Registration of* 3-*D Shapes*. IEEE Trans. on Pattern Analysis and Machine Intelligence (Los Alamitos, Calif.; USA: IEEE Computer Society) 14 (2): 239-256) and the Generalized Procrustes Analysis (GPA). Further, in an exemplary embodiment, combining/merging include embedding GPA in an ICP framework to efficiently minimize alignment error. See (Toldo, R., Beinat, A., & Crosilla, F. (2010). *Global registration of multiple point clouds embedding the Generalized Procrustes Analysis into an ICP framework*. In 3DPVT 2010 Conference).

Figure 2A:
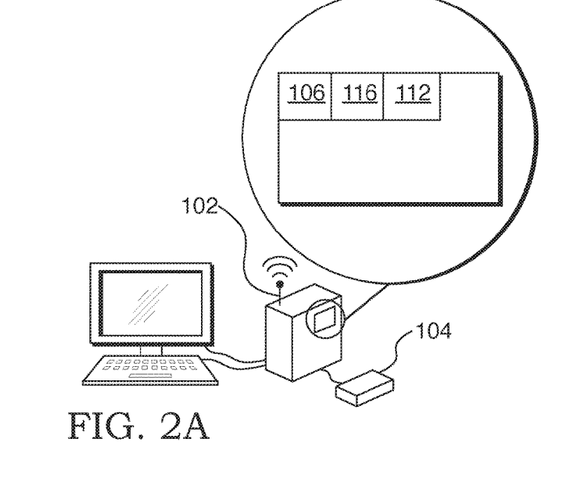
FIG. 2A is a detailed schematic view of the modules on the computer.

It is understood that, in an exemplary embodiment, converting 1100 images within a group to a number of 3D models and merging 1200 a number of the 3D models are performed in a computer 100. Further, utilizing 1300 the multi-scale 3D model, depending upon the nature of the utilization, occurs on a computer 100. Thus, the method includes transferring 900 data to the computer 100, as is known. In an exemplary embodiment, the drone 60 and the computer 100 include a wireless communication assembly 65, 102, respectively. Alternatively, data is stored on media such as, but not limited to, flash drives, CDs; magnetic media, optical media, or similar devices, none shown. The data may also be captured on film, magnetic video media; or similar devices, none shown. If the images or pictures are captured in a hard forma, e.g., film, photographic paper or similar devices, none shown, then the computer 100 includes a scanner 104. Further, in this embodiment; acquiring 1000 a number of images of a number of physical locations includes scanning 1001 the images/pictures, as is known. It is understood that a scanned image/picture is stored in a digital format.

The computer 100 includes a number of "common modules," identified collectively as common modules 106, that are known. That is, as used herein, the "common modules" include an operating module, a communication module (for the physical aspects of communication, e.g., an Ethernet connection), an internet module (including a browser, email, and chat modules), an input module, e.g., for communicating via keyboard and mouse or similar devices, a video driver module, and a storage module. The computer 100, in an exemplary embodiment, also includes other known modules such as, but not limited to, a scanner module, an encryption module, a (virus) protection module, and application modules. It is further understood that the data corresponding to the acquired images are, in an exemplary embodiment, stored in the storage module. Further, as discussed below, other data modules, such as, hut not limited to, cloud data modules are also stored in the storage module. Thus, the method also includes providing 900 a computer 100 having a number of modules, including common modules 106. Other modules that are included with the computer being provided 900 are discussed below.

Once the images, or pictures, are captured the images are converted to a 3D model. Converting 1100 images within a group to a number of 3D models includes generating 1102 a top sparse point cloud from both the top picture group and the next inferior picture group which, in the exemplary embodiment, is the intermediate picture group. That is, the generation 1102 of the "top sparse point cloud" includes "combining" a number of sparse point clouds, as discussed below. Further, as used herein, the point cloud including the top picture group data is identified as the "top" point cloud even when combined with other data. In an exemplary embodiment, generating 1102 atop sparse point cloud from both the top picture group and the next inferior picture group includes using 1104 photogrammetry. As is known, photogrammetry, and similar methods, generate a number of identifiable points from the pictures. It is understood that this data is stored in the storage module.

Figure 3:
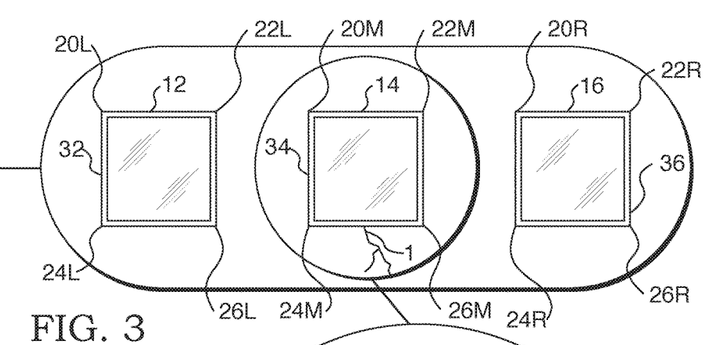
FIG. 3 is a detailed view of the windows on the building.

Continuing with the example above, and understanding that this is still a simplified example, using 1104 photogrammetry generates data corresponding to each of the window centers, 13, 15, 17, each of the window corners 20, 22, 24, 26 and various frame corners 40, 42, 44, 46, 48, 50, 52, 54, 56, 58. The data is corresponding to identifiable features from the acquired images/pictures are, as used herein, "feature points." That is, for example, a specific feature point, e.g., the center of the leftmost window in FIG. 2 would be identified as a "window center feature points" in the following discussion. Further, the feature points from a group of pictures are, as used herein, "[X] feature points." That is, for example, after identifying 1110 (as discussed below) in the top picture group a number of feature points, those feature points are then, as used herein, the "top picture group feature points." This nomenclature applies to other groups as well.

Further, and to be clear, the "feature points" are anything identified in the images and include, but are not limited to, the "features of interest" discussed above. That is, as used herein, "feature points" and "features of interest" are not defined as the same thing. Stated alternately, if they are identifiable, then "features of interest" define a number of "feature points," but if they are not identifiable, then a "feature of interest" does not define a number of "feature points."

Generating 1102 atop sparse point cloud from both the top picture group and the next inferior picture group includes identifying 1110 in the top picture group a number of feature points, identifying 1112 in the next inferior picture group a number of feature points, matching 1114 the top picture group feature points with a number of corresponding next inferior picture group feature points, and replacing 1116 the top picture group feature points with the corresponding next inferior picture group feature points.

Further, replacing 1116 the top picture group feature points with the corresponding next inferior picture group feature points includes triangulating 1118 the location of the corresponding next inferior picture group feature points in a 3D space. In an exemplary embodiment, the matching 1114 the top picture group feature points with a number of corresponding next inferior picture group feature points, replacing 1116 the top picture group feature points with the corresponding next inferior picture group feature points, and triangulating 1118 the location of the corresponding next inferior picture group feature points in a 3D space may be collectively identified as combining 1119 the top picture group feature points and the corresponding (next) inferior picture group feature points. That is, in this exemplary embodiment, combining 1119 the top picture group feature points and the corresponding (next) inferior picture group feature points includes the three actions 1114, 1116, 1118 identified above. It is understood that other methods/modules may combine 1119 the top picture group feature points and the corresponding (next) inferior picture group feature points in another manner.

The following is a simplified, non-limiting, detailed example of generating 1102 a top sparse point cloud from both the top picture group and the next inferior picture group. When identifying 1110 in the top picture group a number of feature points, the method would identify three window centers 13, 15, 17 and generate a left window center feature point, a middle window center feature point, and a right window center feature point. When identifying 1112 in the next inferior picture group a number of feature points from the intermediate picture group, the method would identify the four left window corners 20L, 22L, 24L, 26L, the middle window corners 20M, 22M, 24M, 26M, and the right window corners 20R, 22R, 24R, 26R, and generate feature points for each. When matching 1114 the top picture group feature points with a number of corresponding next inferior picture group feature points, the method uses known algorithms for matching image data. For example, the three window center feature points are matched with the various window feature points. That is, "matching," as used herein, means that a module 110, described below, creates a data relationship between the feature points. For example, the module creates a relationship between the left window center feature point and the four left window corner feature points.

When the method replaces 1116 the top picture group feature points with the corresponding next inferior picture group feature points, a "combined" point cloud is created wherein the data corresponding to the window center feature points is replaced with the data corresponding to the window corner feature points. That is, and again as a simplified example, using 1104 photogrammetry on the top picture group alone would have generated a point cloud including:

4 four points corresponding to the four corners of the wall having the windows 12, 14, 16
1 one point corresponding to a door center
1 one point corresponding to the crack 1
<u>3</u> three points corresponding to the window centers 13, 15, 17
9

As such there would be nine points in the point cloud. By replacing 1116 the top picture group feature points with the corresponding next inferior picture group feature points, the three points corresponding to the window centers 13, 15, 17 are replaced with the twelve points corresponding to the window corners. That is ((9 points−3 points)+12 points=18 points. Thus, the top sparse point cloud, after being combined with the intermediate sparse point cloud, includes more data than would be acquired using photogrammetry for a single group of pictures.

Further, in an embodiment wherein there are a plurality of intermediate image/picture groups, the method essentially repeats generating 1102 a top sparse point cloud from both the top picture group and the next inferior picture group. That is, the method as described above is performed as described in relation to generating 1102 a top sparse point cloud from both the top picture group and the next inferior picture group except that, rather than utilizing the original top sparse point cloud, the newly created top sparse point cloud, which includes data from the first inferior picture group, is combined with the second, i.e., the new "next inferior picture group." This, of course, means that pictures from the second inferior picture group are used in identifying 1112 in the next inferior picture group a number of feature points, matching 1114 the top picture group feature points with a number of corresponding next inferior picture group feature points, replacing 1116 the top picture group feature points with the corresponding next inferior picture group feature points and triangulating 1118 the location of the corresponding next inferior picture group feature points in a 3D space. It is understood that this portion of the method is repeated as long as there are intermediate image/picture groups.

Accordingly, the computer 100 is also provided, as part of the "providing 900 modules" recited above, with a conversion module 110 structured to convert each image to a number of 3D models by generating a top sparse point cloud from both the top picture group and the next inferior picture group which, in the exemplary embodiment, is the intermediate picture group. Further, the conversion module 110 is structured to use photogrammetry. Further, the conversion module 110 is structured to identify in the top picture group a number of feature points, identify in the next inferior picture group a number of feature points, match the top picture group feature points with a number of corresponding next inferior picture group feature points, and replace the top picture group feature points with the corresponding next inferior picture group feature points. In an exemplary embodiment, the conversion module 110 is structured to triangulate the location of the corresponding next inferior picture group feature points in a 3D space. Further, the conversion module 110 is structured to perform these steps repeatedly if there are multiple intermediate image/picture groups. Further, it is understood that the method includes performing the generating 1102 atop sparse point cloud from both the top picture group and the next inferior picture group on a computer 100.

Converting 1100 images within a group to a number of 3D models also includes generating 1120 a base sparse point cloud from the base picture group. Generating 1120 a base sparse point cloud from the base picture group also includes using 1105 photogrammetry. Accordingly the conversion module 110 is further structure to generate abuse sparse point cloud from the base picture group which, in an exemplary embodiment, is done by using photogrammetry. It is understood that the method includes performing the generating 1120 a base sparse point cloud from the base picture group on a computer 100.

Converting 1100 images within a group to a number of 3D models also includes generating 1130 a top dense point cloud from the top sparse point cloud using known methods and programs/modules. This is also identified herein as generating 1150 a global point cloud from the top dense point cloud. That is, the final top dense point cloud is identified herein as a "global point cloud." Converting 1100 images within a group to a number of 3D models also includes generating 1140 a base dense point cloud from the base sparse point cloud using known methods and programs/modules. This is also identified herein as generating 1160 a local point cloud from the base dense point cloud. That is, the base dense point cloud is identified herein as a "local point cloud."

Accordingly the conversion module 110 is further structured to convert each image to a number of 3D models by generating a top dense point cloud from the top sparse point cloud, and, to convert each image to a number of 3D models by generating a base dense point cloud from the base sparse point cloud. It is understood that the method includes converting images in a group to a number of 3D models by generating a top dense point cloud from the top sparse point cloud, and, converting images in a group to a number of 3D models by generating a base dense point cloud from the base sparse point cloud on a computer 100.

Accordingly the conversion module 110 is further structured to convert each image to a number of 3D models by generating a global point cloud from the top dense point cloud, and, to convert each image to a number of 3D models by generating a local point cloud from the base dense point cloud. It is understood that the method includes converting images in a group to a number of 3D models by generating a global point cloud from the top dense point cloud, and, converting images in a group to a number of 3D models by generating a local point cloud from the base dense point cloud on a computer 100.

Merging 1200 a number of the 3D models from the base model group and a number of 3D models from another 3D model group to create a multi-scale 3D model includes identifying 1210 in the global point cloud a number of feature points, identifying 1212 in the local point cloud a number of feature points, matching 1214 the global point cloud feature points with a number of corresponding local point cloud feature points, and creating 1216 a multi-scale point cloud by replacing the global point cloud feature points with the corresponding local point cloud feature points. This portion of the method is performed in a manner substantially similar to performing generating 1102 a top sparse point cloud from both the top picture group and the next inferior picture group, as described above. It is noted that the iterative closest point algorithm may not be effective in processing feature points used in 3D triangulation, but the process is effectively similar. Further, in this exemplary embodiment, matching 1214 the global point cloud feature points with a number of corresponding local point cloud feature points and creating 1216 a multi-scale point cloud by replacing the global point cloud feature points with the corresponding local point cloud feature points are collectively identified herein as merging 1218 the global point cloud feature points with a number of corresponding local point cloud feature points. It is understood that other methods/modules could merge 1218 the global point cloud feature points and the local point cloud feature points in another manner.

Accordingly, the computer 100 is also provided, as part of the "providing 900 modules" recited above, with a merging module 120 structured to merge a number of the 3D models from the base model group and a number of 3D models from another model group to create a multi-scale 3D model. The merging module 120 is structured to identify in the global point cloud a number of feature points, identify in the local point cloud a number of feature points, match the global point cloud feature points with a number of corresponding local point cloud feature points, and create a multi-scale point cloud by replacing the global point cloud feature points with the corresponding local point cloud feature points. Further, it is understood that the method includes performing the merging 1200 a number of the 3D models from the base model group and a number of 3D models from another 3D model group to create a multi-scale 3D model on a computer 100.

The multi-scale 3D models are used for any known purpose. In an exemplary embodiment, however, utilizing 1300 the multi-scale 3D model includes utilizations selected from the group consisting of utilizing 1302 the multi-scale 3D model for post-disaster reconnaissance and forensics, utilizing 1304 the multi-scale 3D model for accident documentation and assessment, utilizing 1306 the multi-scale 3D model for infrastructure inspection and maintenance documentation, utilizing 1308 the multi-scale 3D model for engineering analyses, utilizing 1310 the multi-scale 3D model for maritime vessel inspection and documentation, and utilizing 1312 the multi-scale 3D model for creating objects for virtual simulations, such as, but not limited to video games. The method as described above solves the stated problems above. Further, the creation and use of multi-scale 3D model solves the stated problems above.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A method of creating a three dimensional model based on two dimensional images, comprising the steps of:
    acquiring a first set of images taken along a first radial path of capture at a first radial distance with respect to a common reference point at a physical structure, wherein each image of the first set of images is taken from a different location at the first radial distance along the first radial path of capture, and wherein each image of the first set of images is focused on the common reference point;
    acquiring a second set of images taken along a second radial path of capture at a second radial distance with respect to the common reference point, wherein each image of the second set of images is taken from a different location at the second radial distance along the second radial path of capture, and wherein the second radial distance is about twice as long the first radial distance and each image of the second set of images is focused on the common reference point;
    generating a first 3D model from the first set of images and a second 3D model from the second set of images based on a first plurality of feature points in each image of the first set of images, and a second plurality of feature points in each image of the second set of images, respectively; and
    merging the first 3D model from the first set of images with the second 3D model from the second set of images to generate a multi-scale 3D model using an iterative closest point algorithm or a generalized procrustes analysis, wherein the multi-scale 3D model comprises a merged set of feature points comprising a subset of the first plurality of feature points and a subset of the second plurality of feature points, and wherein the merged set of feature points comprises a merged density greater than a density of the first plurality of feature points and a density of the second plurality of feature points, wherein the merged density provides enhanced 3D image resolution for identifying unique characteristics of the physical structure at the common reference point, wherein the unique characteristics of the physical structure are perceptible to a size of about 0.1 mm.

2. The method of claim 1, wherein the common reference point corresponds to one or more characteristics at a physical location.

3. The method of claim 1, wherein the first radial path of capture and the second radial path of capture each maintain the first radial distance and the second radial distance, respectively, with respect to common reference point, and each correspond to a range of about 70 degrees to 180 degrees with respect to the common reference point.

4. The method of claim 2, wherein particular images in each of the first set of images and the second set of images include overlapping portions of the one or more characteristics at the physical location, wherein the particular images in the first set of images include a higher percentage of overlap than the particular images in the second set of images.

5. The method of claim 4, wherein: the first set of images includes about a 90% overlap of the portions of the one or more characteristics at the physical location; and the second set of images includes about an 80% overlap of the portions of the one or more characteristics at the physical location.

6. The method of claim 3, wherein the first set of images and the second set of images are acquired via a camera operatively connected to a drone.

7. The method of claim 6, wherein the drone is configured to travel along the first radial path of capture and the second radial path of capture at a consistent elevation.

8. The method of claim 1, wherein the first set of images and the second set of images include substantially similar characteristics.

9. The method of claim 1, wherein the step of generating a first 3D model and a second 3D model further comprises generating one or more point clouds representative of the first plurality of feature points and the second plurality of feature points.

10. The method of claim 1, wherein merging the first 3D model from the first set of images with the second 3D model from the second set of images to generate a multi-scale 3D model comprises an iterative closest point algorithm.

11. The method of claim 1, wherein merging the first 3D model from the first set of images with the second 3D model from the second set of images to generate a multi-scale 3D model comprises a generalized procrustes analysis.

* * * * *

UNITED STATES PATENT AND TRADEMARK OFFICE
CERTIFICATE OF CORRECTION

PATENT NO. : 10,475,234 B2
APPLICATION NO. : 15/211041
DATED : November 12, 2019
INVENTOR(S) : David Lattanzi et al.

Page 1 of 1

It is certified that error appears in the above-identified patent and that said Letters Patent is hereby corrected as shown below:

In the Specification

Column 1, Line 11, after the subtitle "CROSS REFERENCE TO RELATED APPLICATION", please add:
-- STATEMENT REGARDING FEDERALLY SPONSORED RESEARCH
This invention was made with government support under grant number CMMI1433765 awarded by the National Science Foundation. The government has certain rights in the invention. --

Signed and Sealed this
Twenty-fifth Day of August, 2020

Andrei Iancu
*Director of the United States Patent and Trademark Office*